No. 646,215. Patented Mar. 27, 1900.
G. J. H. HENRICI.
COMBINED CHECK HOOK AND HARNESS HANGER.
(Application filed Dec. 5, 1899.)

(No Model.)

WITNESSES:

K. M. Imboden
H. A. Spencer

INVENTOR,

George J. H. Henrici.

BY HIS ATT'YS,

Higdon & Higdon.

UNITED STATES PATENT OFFICE.

GEORGE J. H. HENRICI, OF OVERBROOK, KANSAS.

COMBINED CHECK-HOOK AND HARNESS-HANGER.

SPECIFICATION forming part of Letters Patent No. 646,215, dated March 27, 1900.

Application filed December 5, 1899. Serial No. 739,324. (No model.)

*To all whom it may concern:*

Be it known that I, GEORGE J. H. HENRICI, a citizen of the United States, residing at Overbrook, Osage county, Kansas, have invented a certain new and useful Combined Check-Hook and Harness-Hanger, of which the following is a specification.

My invention relates to a combined check-hook and hanger for harnesses and aims to provide a device which shall serve as a check-hook when the harness is in use on the horse and also when the harness is not in use as a convenient hanger for hanging the same up in the closet or apartment provided in the carriage-house or stable.

Figure 1:
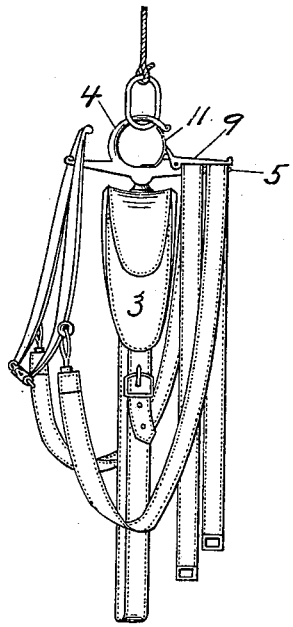
Figure 2:
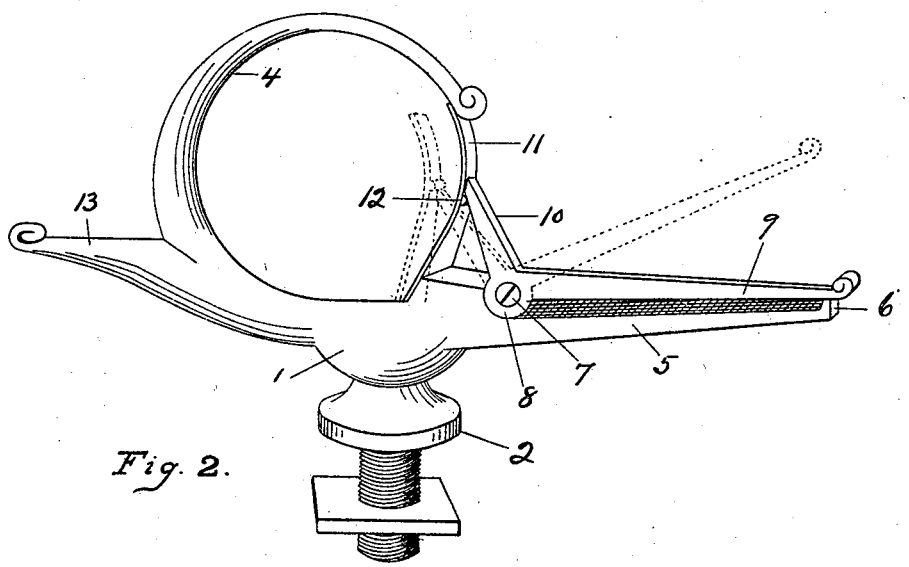

In the drawings, Figure 1 represents my device in position on a harness-saddle, the harness being hung up, and illustrates the use of the device as a hanger. Fig. 2 is a perspective view of the device detached from the saddle.

1 designates the body of the device, provided with the threaded shank 2 for attachment to the saddle 3.

4 designates the check-hook proper, which may be of any preferred curvature or form.

An arm 5 projects rearwardly from the body 1 and has, preferably, at its rear end an upwardly-projecting lug 6. On the forward portion of said arm, immediately back of the hook 4, is hinged or pivoted at 7 an oblique obtuse-angled lever 8, one arm 9 of which extends rearwardly preferably to the rear end of arm 5 in vertical alinement with said arm and is adapted to form therewith a pair of gripping-jaws, the points of said arm and lever being, however, slightly separated by reason of the interposing lug 6. The other arm 10 of said lever 8 projects forwardly and bears against the spring 11, mounted on the body 1 and extending upward toward the extremity of the hook 4. Said spring should have normally a constant bearing against the arm 10 of the lever 8 to hold the other arm 9 of said lever firmly pressed against the arm 5. Said spring 11 is provided on its under surface with a ridge or projection 12, adapted to engage the end of the short arm 10 of the lever 8 and hold the long arm 9 out of engagement with arm 5 when desired. The opposed inner surfaces of the arms 5 9 are roughened or corrugated to give them a firmer bearing on any article placed between them.

At the forward end of the device is provided a projecting hook or arm 13, which may be of any preferred form suited to the purposes of a hook.

In practice the device is mounted on the harness-saddle and used as a check-hook in the ordinary manner. When the harness is removed from the horse, it is suspended by the hook 4 from the ring, hook, or peg in the harness-closet. The lever 8 is then operated to throw back the spring 11 until the short arm 10 catches under the projection 12 of the spring, thus holding the arms or jaws 5 9 open. The forward portion of the harness—such as the hames, bridle, collar, &c.—is then placed on the projection or hook 13, and the rear portion—such as the tugs, reins, breeching, &c.—is placed over the arm 5. The spring 11 is then released and the arm 9 of the lever 8 dropped, after which the stress of said spring 11 holds the arms 5 9 in engagement, keeping the portions of the harness held between them firmly in position, preventing them from falling to and trailing on the floor, &c.

The device has been found in practice to be of great convenience and utility.

I claim as my invention and desire to secure by Letters Patent—

A combined check-hook and harness-hanger comprising a body portion having a shank to engage the saddle, an upwardly-projecting hook, a spring mounted in the opening of said hook, and forwardly and rearwardly projecting arms, in combination with a pivoted lever mounted on said rearward arm and forming therewith a pair of gripping-jaws, and having a forward projection bearing against said spring, to hold said jaws in engagement, substantially as set forth.

In testimony whereof I affix my signature in the presence of two witnesses.

GEORGE J. H. HENRICI.

Witnesses:
C. L. REED,
H. F. HARTMAS.